US012573372B2

(12) United States Patent
Pearson et al.

(10) Patent No.: US 12,573,372 B2
(45) Date of Patent: Mar. 10, 2026

(54) TEXT-TO-SPEECH SYSTEM WITH VARIABLE FRAME RATE

(71) Applicant: SoundHound, Inc., Santa Clara, CA (US)

(72) Inventors: Steve Pearson, Felton, CA (US); Jon Grossman, Cupertino, CA (US)

(73) Assignee: SoundHound AI IP, LLC, Santa Clara, CA (US)

( * ) Notice: Subject to any disclaimer, the term of this patent is extended or adjusted under 35 U.S.C. 154(b) by 693 days.

(21) Appl. No.: 18/051,507

(22) Filed: Oct. 31, 2022

(65) Prior Publication Data

US 2024/0144910 A1 May 2, 2024

(51) Int. Cl.
*G10L 13/047* (2013.01)
*G10L 13/06* (2013.01)

(52) U.S. Cl.
CPC ............ *G10L 13/047* (2013.01); *G10L 13/06* (2013.01)

(58) Field of Classification Search
None
See application file for complete search history.

(56) References Cited

U.S. PATENT DOCUMENTS 8,527,276 B1 * 9/2013 Senior .................... G06N 3/084 704/258
2023/0335110 A1 * 10/2023 Kenter .................. G10L 15/063

OTHER PUBLICATIONS

Shen, Jonathan, Ruoming Pang, Ron J. Weiss, Mike Schuster, Navdeep Jaitly, Zongheng Yang, Zhifeng Chen et al. "Natural tts synthesis by conditioning wavenet on mel spectrogram predictions." In 2018 IEEE international conference on acoustics, speech and signal processing (ICASSP), pp. 4779-4783. IEEE, 2018.
Valin, Jean-Marc, and Jan Skoglund. "LPCNet: Improving neural speech synthesis through linear prediction." In ICASSP 2019-2019 IEEE International Conference on Acoustics, Speech and Signal Processing (ICASSP), pp. 5891-5895. IEEE, 2019.

* cited by examiner

*Primary Examiner* — Nafiz E Hoque
(74) *Attorney, Agent, or Firm* — Platinum Intellectual Property PC

(57) ABSTRACT

A neural TTS system is trained to generate key acoustic frames at variable rates while omitting other frames. The frame skipping depends on the acoustic features to be generated for the input text. The TTS system can interpolate frames between the key frames at a target rate for a vocoder to synthesis audio samples.

16 Claims, 16 Drawing Sheets

450

1000

TEXT-TO-SPEECH SYSTEM WITH VARIABLE FRAME RATE

SUMMARY OF THE INVENTION

The following specification describes many aspects of improved TTS systems and example embodiments that illustrate some representative combinations with optional aspects. Some examples are process steps or systems of machine components for speech synthesis and its applications. These can be implemented with computers that execute software instructions stored on non-transitory computer-readable media.

The present subject matter describes improved approaches to an optimized TTS system. According to some embodiments, various computer-implemented methods and approaches, including neural network models, can be adopted to implement the present TTS system. The system can generate variable-rate frames via a speech synthesis model, through which key frames are kept and other frames with little information are omitted. With fewer frames to generate per utterance, the system can reduce the execution time and speed up speech synthesis. According to some embodiments, the TTS system can reconstruct and approximate the frames that would have been generated for the input text without skipping frames via various methods, for example, linear interpolation or model inference. As such, the synthesized speech waveforms can be intelligible and natural.

According to some embodiments, the TTS system can transmit various functions, e.g., interpolation and/or voice synthesis, to a lower-power system for execution. The lower-power system, e.g., a mobile computing device, can then locally interpolate or de-compress the key frames generated, thus resulting in reduced bandwidth of voice information for the mobile device. As such, the optimized TTS system can reduce processing latency and bandwidth in speech synthesis. Furthermore, it can also improve data security and privacy and increase the quality of the synthesized speech.

According to some embodiments, for the reconstruction or approximation of frames, each of the generated key frames can include an interpolation parameter. For example, the interpolation parameter can indicate the number of skipped frames between the plurality of key frames or other interpolation information such as variable frame rate or period or an indicated interpolation mode. The interpolation process can be implemented before a vocoder model or directly by a vocoder model. Furthermore, according to some embodiments, the interpolation process is not needed when a neural vocoder can recognize, associate and generate the waveform samples based on the variable-rate key frames.

According to some embodiments, a vocoder model can generate speech waveforms based on the reconstructed frames, which comprise both the key frames and the interpolated frames. According to some embodiments, a neural vocoder can directly generate speech waveforms based on the key frames without interpolation. According to some embodiments, the vocoder model can be a neural vocoder or a conventional signal-processing-based vocoder.

To enable the speech synthesis model to generate the fewer but more information rich frames, the model can be trained with compressed datasets. According to some embodiments, various approaches can be adopted to generate the compressed datasets, including choosing compressed datasets with the minimized sum of square errors of approximation. For example, the training data pair can be <text, compressed audio recordings>. The original audio/frames of the training datasets are compressed in such a way that the non-essential audio/frames are omitted.

According to some embodiments, a neural vocoder can be trained together with the speech synthesis model with the same compressed datasets so that it can directly generate waveform samples based on the key frames without the interpolation or reconstruction process.

Accordingly, the present TTS system can be efficient and responsive for generating real time and natural speech for human-computer communications, thus enhancing the user experience of a voice-enabled interface.

A computer implementation of the present subject matter comprises a computer-implemented method of speech synthesis, which comprises: receiving a sequence of symbols; and synthesizing from the sequence of symbols, by a speech synthesis model, a plurality of key frames, wherein the key frames have a variable frame rate, and wherein a key frame comprises at least one interpolation parameter that indicates the variable frame rate.

According to some embodiments, at least one interpolation parameter can indicate, for example, one or more skipped frames between the plurality of key frames, a length of time between the key frames, an indicated interpolation mode such as linear interpolation, code book.

According to some embodiments, the speech synthesis model can generate the plurality of key frames based on an average key frame rate input, wherein the ratio of the number of the plurality of key frames and the one or more skipped frames is associated with the average key frame rate input.

According to some embodiments, the TTS system can interpolate one or more interpolated or skipped frames based on the at least one interpolation parameter. A vocoder model can generate speech waveforms based on the key frames and the interpolated frames. It can synthesize waveforms from low-dimensional acoustic representation, such as Bark spectrograms or Mel-spectrograms. According to some embodiments, a vocoder model can be a neural vocoder or a conventional vocoder.

DESCRIPTION OF DRAWINGS

The present subject matter is illustrated by way of example, and not by way of limitation, in the figures of the accompanying drawings and in which.

DETAILED DESCRIPTION

The present subject matter pertains to improved approaches for a speech synthesis system with low latency and improved efficiency. By predicting fewer frames with variable frame rates without voice-quality loss, the system can deliver synthesized speeches with reduced latency and improved efficiency. Embodiments of the present subject matter are discussed below with reference to FIGS. 1-14.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The following sections describe process steps and systems of machine components for generating synthesized speeches and its applications. These can be implemented with computers that execute software instructions stored on non-transitory computer-readable media. Improved systems for optimized speech synthesis can have one or more of the features described below.

Figure 1A:
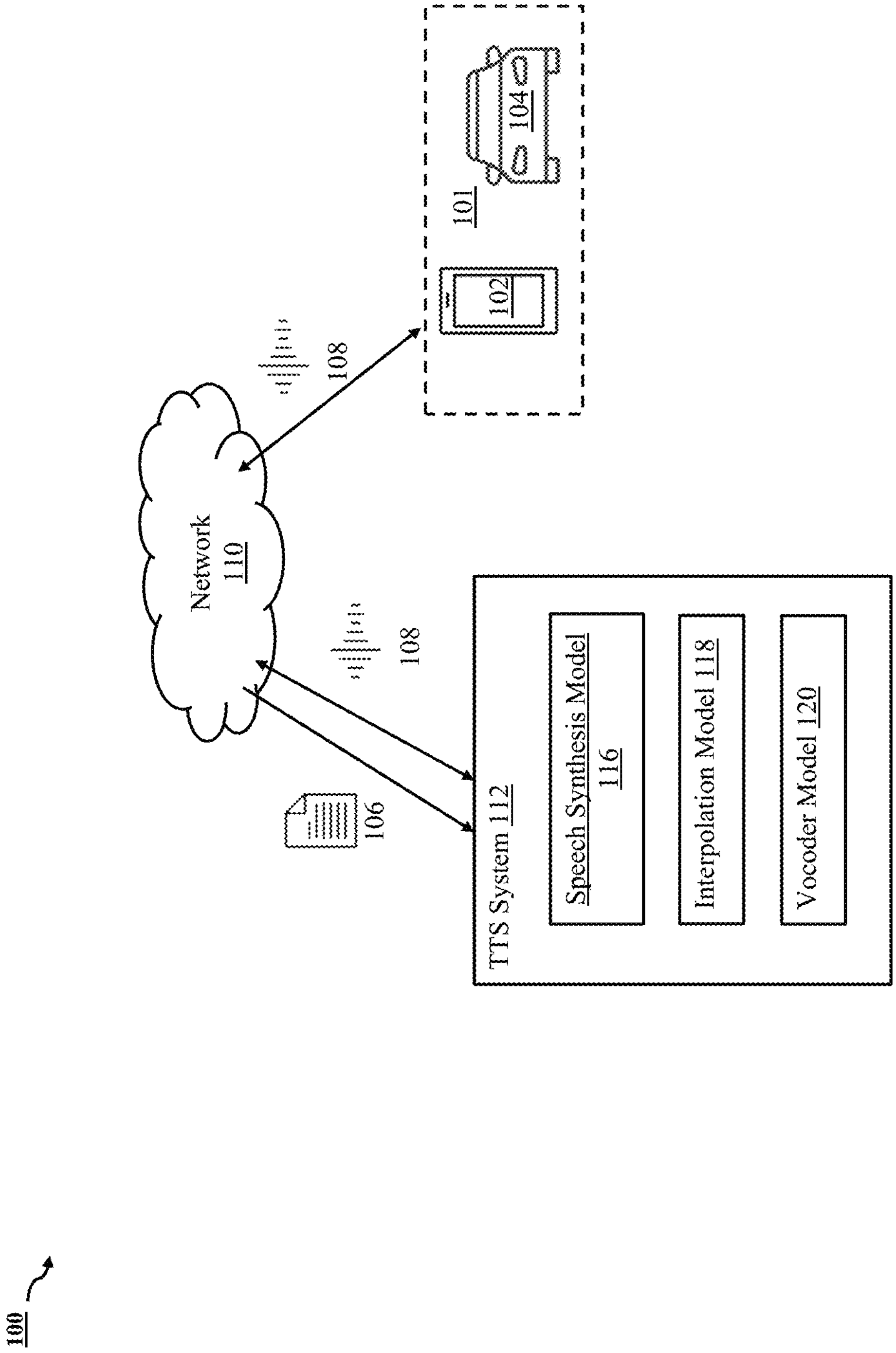
FIG. 1A shows an exemplary diagram of a text-to-speech (TTS) system for speech synthesis, according to one or more embodiments of the present subject matter.

FIG. 1A shows an exemplary diagram 100 of a text-to-speech (TTS) system 112 in communication with a client device 101. According to some embodiments, TTS system 112 can receive input text 106 for speech synthesis. TTS system 112 can convert input text 106 into a phoneme sequence or a sequence of symbols. For example, a pronunciation dictionary, such as Carnegie Mellon University's standard English phoneme codes, can be used to generate the phoneme sequence. TTS system 112 can generate speech waveforms 108 based on the phoneme sequence using at least one or more of a speech synthesis model 116, interpolation model 118 and a vocoder model 120.

According to some embodiments, in a frame-based mechanism, speech synthesis model 116 can be a neural acoustic model configured to process the phoneme sequence to infer the acoustic frames, such as Mel-scale spectrogram or Bark-scale spectrogram. It can be trained to skip highly redundant frames and only keep key frames that have a high information content relative to one or more prior key frames. Furthermore, each key frame can comprise an interpolation parameter for the later interpolation process to estimate information between key frames.

According to some embodiments, interpolation model 118 can reconstruct or interpolate the skipped frames at least based on the interpolation parameter. The key frames and the interpolated frames are input for vocoder model 120 to generate the speech waveforms 108, which can be transmitted to a client device 101 for communication with a user.

Client device 101 can render waveforms 108 as speech. The client device 101 can be any computing device with a speaker capable of rendering the speech. As shown in FIG. 1A, examples of a client device 101 can be a mobile phone 102 or a smart car 104. Other client devices can be, for example, an AR headset, smart glasses a tablet computer, a telephone interactive voice response system, a retail voice ordering system, or a restaurant ordering kiosk. In addition to the at least one speaker, Client device 101 can further comprise at least one processor, at least one microphone for receiving voice commands, and at least one network interface configured to connect to network 110. Cloud servers often have more computing performance than client devices. By performing synthesis functions using a cloud server, it is able to deliver better sounding speech synthesis than doing it on the client device. Also, offloading the processing from the client to the server allows battery powered and other power sensitive client devices to have longer run times between battery charges.

According to some embodiments, TTS system 112 can be implemented by a virtual assistant to provide a voice-enabled interface for a client device 101. The virtual assistant can be a software agent that can be integrated into different types of devices and platforms. For example, the virtual assistant can be incorporated into smart speakers. It can also be integrated into voice-enabled applications for specific companies.

Network 110 can comprise a single network or a combination of multiple networks, such as the Internet or intranets, wireless cellular networks, local area network (LAN), wide area network (WAN), WiFi, Bluetooth, near-field communication (NFC), etc. Network 110 can comprise a mixture of private and public networks, or one or more local area networks (LANs) and wide-area networks (WANs) that may be implemented by various technologies and standards.

Figure 1B:
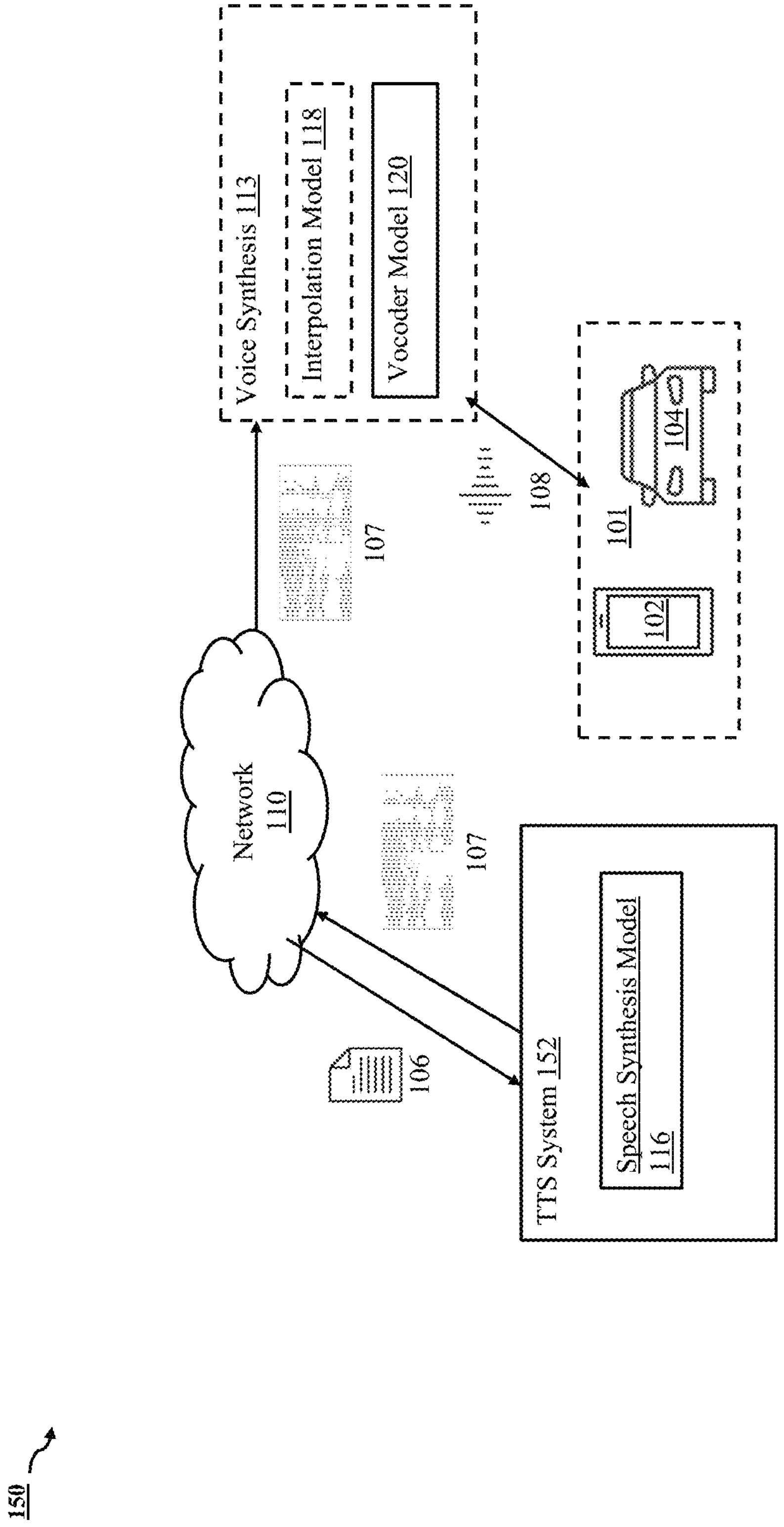
FIG. 1B shows another exemplary diagram of a TTS system for speech synthesis, according to one or more embodiments of the present subject matter.

FIG. 1B shows another exemplary diagram 150 of a text-to-speech (TTS) system 152 with an alternative network and computing structure. According to some embodiments, the TTS system 152 can generate the key frames and transmit them to a lower-power system, such as a mobile computing device or embedded systems via network 110. The lower-power system can then locally interpolate or de-compress the key frames generated by the speech synthesis model, thus resulting in a distributed computing/networking structure. As such, the optimized TTS system can reduce synthesis latency and bandwidth of voice information in speech synthesis.

For example, some or all functions related to interpolation and voice synthesis can be implemented by processors distributed throughout network 110, such as a user's mobile device. This edge computing can not only reduce the latency of speech synthesis, but also bandwidth use of the client device 101. In addition, it can also improve data security and privacy and increase the quality of the synthesized speech.

According to some embodiments, partial functions of TTS 152, such as interpolation model 118 and vocoder model 120, can be implemented by client device 101. Accordingly, key frames 107 can be transmitted to client device 101 for voice synthesis 113. Next, interpolation model 118 can reconstruct or interpolate the skipped frames for the key frames 107 based on various reconstruction methods. Accordingly, vocoder model 120 can generate speech waveforms 108 based on the key frames 107 and the interpolated frames.

According to some embodiments, interpolation model 118 can be omitted when vocoder model 120 is a properly-trained neural model that can recognize key frames 107 and generate the complete speech waveforms. As such, vocoder model 120 can generate natural sounding speech waveforms 108 directly based on the key frames 107.

Figure 2A:
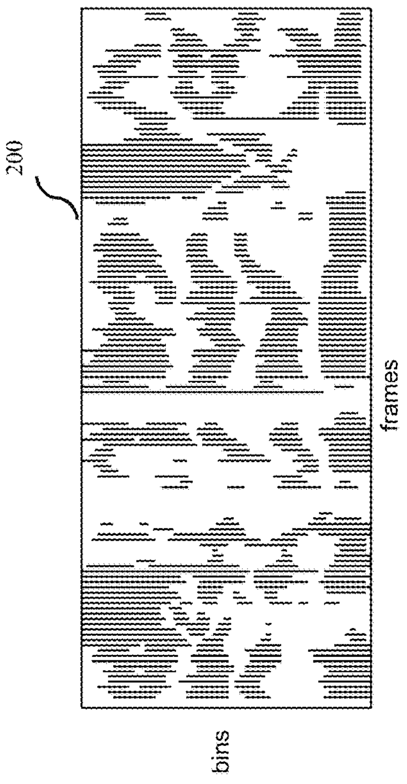
FIG. 2A shows an exemplary spectrogram of speech audio, according to one or more embodiments of the present subject matter.

FIG. 2A shows an exemplary spectrogram 200 of an input text. After receiving the text input, the TTS system can convert it into a phoneme sequence or a sequence of symbols, for example, based on a pronunciation dictionary. According to some embodiments, a speech synthesis model can process the phoneme sequence to generate spectrogram 200 with a number of key frames at variable rates.

A spectrogram can be considered to be a low-dimensional acoustic representation of the input text audio. According to some embodiments, the spectrogram 200 can be generated by segmenting the generated audio signal into frames at a fixed interval, e.g., 10 ms and overlapping window size of 25 ms, generating a short-time Fourier transform of each windowed frame, and computing the power spectrum of each frequency range. Spectrogram 200, or the corresponding Bark spectrogram, can be the input data for some embodiments of a vocoder model.

Figure 2B:
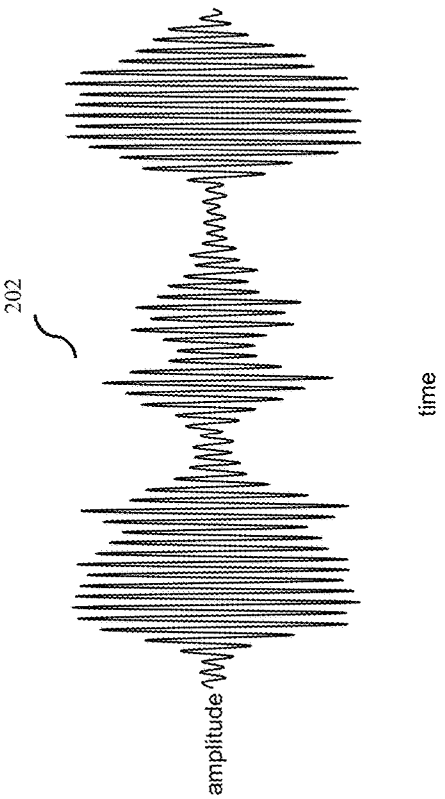
FIG. 2B shows exemplary speech waveforms of an input text, according to one or more embodiments of the present subject matter.

FIG. 2B shows exemplary speech waveforms 202 of the input text. According to some embodiments, a vocoder model can synthesize speech waveforms 202 either directly based on the key frames or based on interpolated frames. Speech waveforms 202 can be time domain representations of sound as its intensity change over time.

Figure 3:
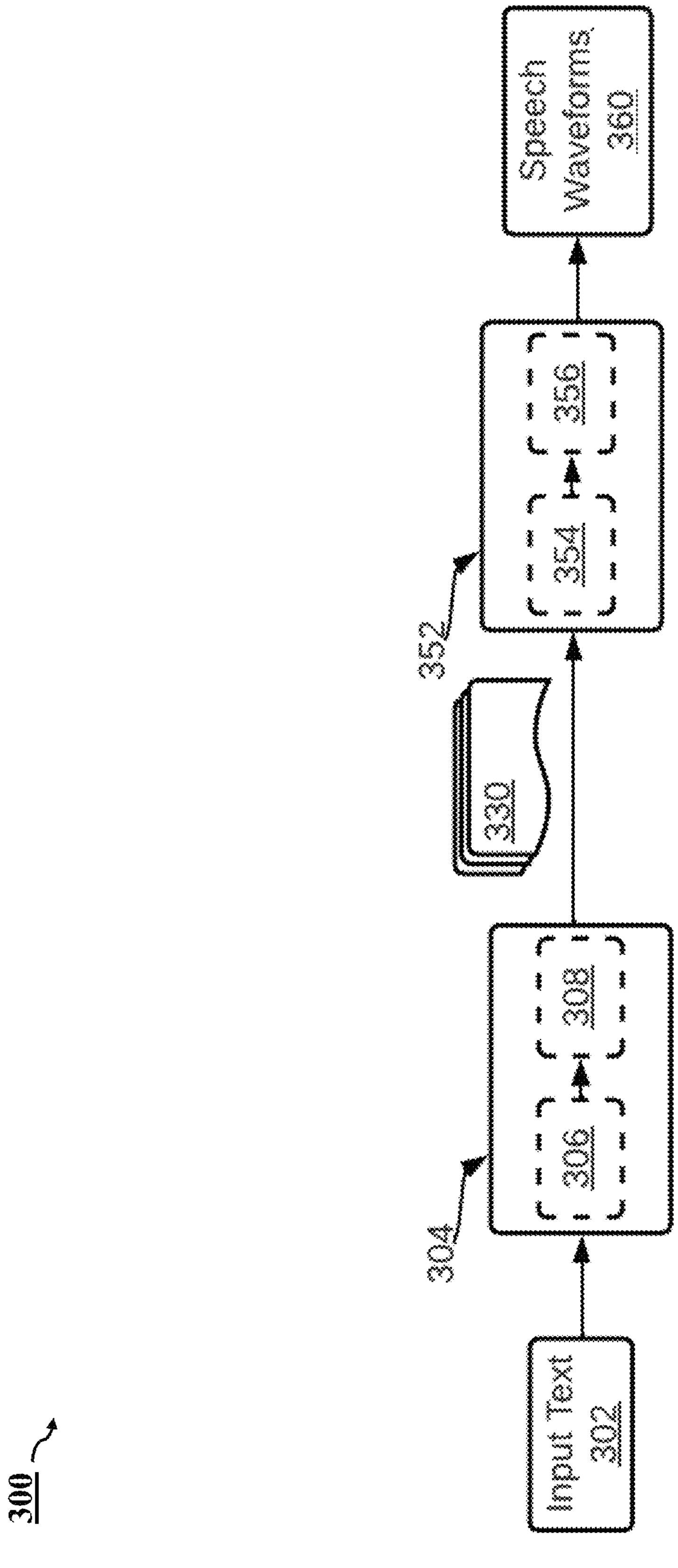
FIG. 3 shows an exemplary diagram of a TTS system for speech synthesis, according to one or more embodiments of the present subject matter.

FIG. 3 shows an exemplary diagram of a neural TTS system 300 for speech synthesis. As shown in this figure, a neural acoustic model such as speech synthesis model 304 can receive input text 302 and infer the acoustic frames 330, such as Mel-scale spectrogram or Bark-scale spectrogram that correspond to input text 302. According to some embodiments, speech synthesis model 304 can be a frame-based model such as Tacotron or Tacotron 2 model or other frame-based TTS model configured to output corresponding acoustic frames. For example, input text 302 can be a textual sentence or an utterance generated by a virtual assistant, such as "Today's weather is sunny."

According to some embodiments, input text 302 can be pre-processed to generate a phoneme sequence, i.e., a sequence of symbols, for input text 302. Furthermore, speech synthesis model 304 can comprise a symbol-rate network 306, and a frame-rate network 308, with location-sensitive attention in between. Both symbol-rate network 306 and frame-rate network 308 can be autoregressive recurrent neural networks. Symbol-rate network 306 can convert the phoneme sequence into a hidden feature representation in a character embedding process, which can be processed by several convolutional layers. The output of the convolutional layers can be further fed into a bi-directional Long Short-Term Memory (LSTM) layer to generate the encoded features. Such encoded features can be the input for a location-sensitive attention layer that generates attention probabilities and location features for the encoded input sequence.

Frame-rate network 308 can predict an acoustic frame from the encoded input sequence one frame at a time. According to some embodiments, frame-rate network 308 can feed the encoded input sequence through, respectively, a pre-net with two connected layers, the LSTM layers, the linear projection and a multi-layer convolutional post-net, to generate. As shown in FIG. 3, speech synthesis model 304 can conventionally generate acoustic frames 330 at fixed rate with a fixed length, for example, 10 ms per frame (100 frames per second).

After the spectrogram frame prediction, the generated acoustic frames 330 are input for a voice synthesizer, such as a vocoder model 352, for generating speech waveforms 360. It can comprise a frame-rate network 354 and a sample-rate network 356.

Figure 4A:
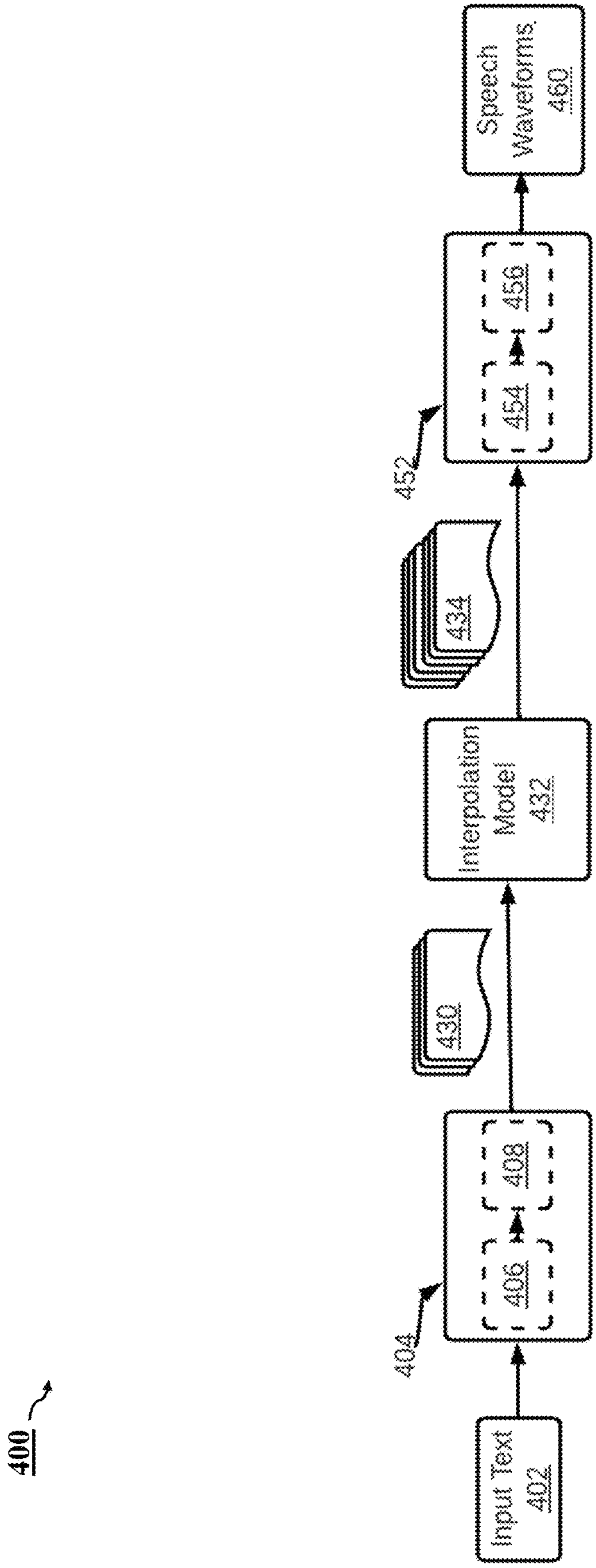
FIG. 4A shows an exemplary diagram of a TTS system for speech synthesis, according to one or more embodiments of the present subject matter.

FIG. 4A shows an exemplary diagram of a TTS system 400 for speech synthesis. As shown in this figure, speech synthesis model 404 can pre-process input text 402 and generate a phoneme sequence. The phoneme sequence can be provided to symbol-rate network 406 and frame-rate network 408 for spectrogram frame prediction. According to some embodiments, speech synthesis model 404 can predict a number of key frames 430 with variable frame rates, while omitting other acoustic frames. The generated frames substantially represent the information corresponding to the phoneme sequence. According to some embodiments, the estimated amount of information remains substantially the same or similar in the key frames 430 as it would if speech synthesis model 404 generated frames at the rate of vocoder processing. According to some embodiments, the skipped frames are ones related to a stable region of a phoneme, for example, the lasting "oo" region in "boot". Generating key frames at just half the rate of vocoder processing can give almost the same synthesized speech quality with only 50% of processing required. With a reduced rate, a deeper, better sounding speech synthesis model can be used for a given processing performance budget and therefore produce even better sounding speech audio, especially for high frequency phonemes such as consonants, while still using just 50% of the bandwidth required for full frame rate generation.

According to some embodiments, each key frames can comprise an interpolation parameter, which can be used to later interpolate the omitted frames by an interpolation model 432. According to some embodiments, the interpolation parameter can indicate the number of the omitted or skipped frames between two consecutive key frames. According to some embodiments, the interpolation parameter can indicate the variable frame rate of key frames 430. According to some embodiments, the interpolation parameter can indicate a length of time between any two consecutive key frames.

Furthermore, according to some embodiments, the interpolation parameter can indicate a preferred interpolation mode or method. Examples of the interpolation mode can be linear interpolation, parabolic interpolation, nearest neighbor method, code book, etc. For example, linear interpolation can apply a distinct linear polynomial between each pair of data points for curves.

According to some embodiments, speech synthesis model 404 can generate the key frames based on an average key frame rate input, and the ratio of the number of key frames and the omitted frames is associated with the average key frame rate input. For example, the average key frame rate can indicate the ratio of the key frames and the omitted frames. The probability of generation of a key frame at a given time step depends, in part, on the amount of recent bandwidth used. This allows adaptive rate control. It also allows dynamic selection of a quality vs bandwidth or quality vs processing performance.

According to some embodiments, upon receiving key frames 430 with the respective interpolation parameters, interpolation model 432 can interpolate the omitted frames via one or more interpolation modes. As a result, interpolation model 432 can reconstruct a number of interpolated frames that are presumably similar to what the omitted frames would have been if generated by the speech synthesis model 404. According to some embodiments, the interpolated frames can be stitched together, in its respective order, with key frames 430 to form de-compressed frames 434.

According to some embodiments, de-compressed frames 434 can be input for a vocoder model 452 to generate speech waveforms 460. Vocoder model 452 can generate speech waveforms based on the key frames and the interpolated frames. It can synthesize waveforms from low-dimensional acoustic representation, such as Bark spectrograms or Mel-spectrograms. According to some embodiments, a vocoder model can be a neural vocoder or a conventional vocoder. According to some embodiments, vocoder model 452 can be an autoregressive model such as LPCNet, WaveGlow, WaveNet and Wave RNN. According to some embodiments, vocoder model 352 can be a Generative Adversarial Networks (GANs) model such as MelGAN. According to some embodiments, vocoder model 452 can be a diffusion probabilistic model such as WaveGrad and DiffWave. According to some embodiments, the vocoder model can be a signal-processing-based vocoder.

According to some embodiments, vocoder model 452 can be an autoregressive model configure to predict the probability of each waveform sample based on previous waveform samples. It can comprise a frame-rate network 454 and a sample-rate network 456, both of which can be autoregressive RNN models. Due to the interpolation of the skipped frames, speech waveforms 460 can share a similar sound quality as could be achieved with a conventional speech synthesis model that generates all frames.

To enable speech synthesis model 404 to predict key frames 430 with variable frame rates, speech synthesis model 404 can be trained with selected training datasets. For example, the training data pair can be <text, compressed audio recordings>. The original audio/frames of the training datasets can be compressed so that the non-essential audio/frames are omitted.

The original datasets can comprise a number of audio clips of one or more speakers. For example, the LJ Speech dataset comprises short audio recordings of a single speaker along with the transcriptions, whereas the LibriTTS dataset comprises multi-speaker English audio clips for many hours. In addition to English datasets, other international languages, such as Chinese, Japanese, Korean, German, French, and Italian can also be utilized for training a TTS for a specific market or application. According to some embodiments, either the raw waveform or pre-processed waveforms, e.g., after compression, can be used as input for the training process.

Different approaches or methods can be adopted to generate compressed datasets that have high-definition and significantly reduce the frame numbers. e.g., 50% or fewer frames. According to some embodiments, the original datasets, e.g., <text, audio recordings>, can be time-warped at a predetermined omission/compression ratio. For example, the omitted frames can be every other frame, or two of every five frames. According to some embodiments, the omitted frames can be redundant frames that contain substantially similar data values to the "neighboring" frames that are kept in the compressed datasets.

Furthermore, various cost/loss functions can be implemented to select a compression approach with least data loss between the original datasets and the compressed datasets. For example, the cost function can be Mixture of Logistics or a normal-loss. The system can implement different versions or scenarios of the compressed datasets using each of the possible configures and select the one with best performance or least loss. For example, a number of potential cost functions can be implemented respectively for all the possible set of frames to omit or the key frames to keep. As a result, a set of key frames or compressed audio recordings that render the least loss can be selected as the compressed training datasets, e.g., <text, compressed audio recordings>.

For example, an exemplary cost function can be based on the sum of square errors from all the Bark parameters linearly interpolated between key frames and relative the omitted original frame that these parameters replaced, as shown below:

$$\text{Cost}=\text{SUM}[\text{over omitted frames } i](\text{SUM}[\text{over bark bin } k](((\text{interp}-\text{value})[i,k]-(\text{orig}-\text{value})[i,k])\hat{\ }2)$$

According to some embodiments, in addition to the linear interpolation method, other interpolation methods, such as parabolic interpolation, nearest neighbor method, code book, can also be adopted. Furthermore, various training algorithms can be used such as gradient descent or adaptive motion.

Figure 4B:
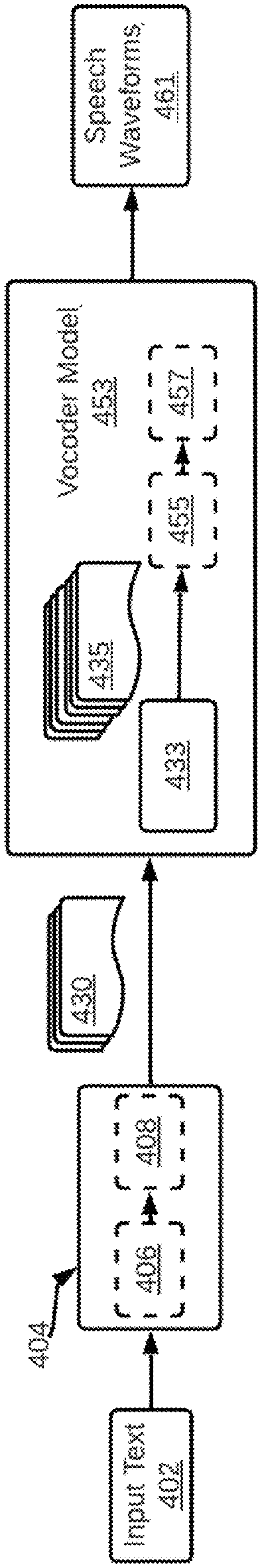
FIG. 4B shows another exemplary diagram of a TTS system for speech synthesis, according to one or more embodiments of the present subject matter.

FIG. 4B shows another exemplary diagram of a TTS system 450 for speech synthesis. Similar to FIG. 4A, speech synthesis model 404 can pre-process input text 402 and generate a phoneme sequence. The phoneme sequence can be provided to symbol-rate network 406 and frame-rate network 408 for spectrogram frame prediction. According to some embodiments, speech synthesis model 404 can predict a number of key frames 430 with variable frame rates, while omitting other frames. According to some embodiments, the estimated amount of information remains substantially the same or similar in the key frames 430. According to some embodiments, the skipped frames can be related to a stable region of a phoneme, for example, the lasting "oo" region in "boot." Furthermore, the estimated number of the key frames can be half of the original frames.

According to some embodiments, each key frames can comprise an interpolation parameter, which can be used to interpolate intermediate frames by an interpolation model 432. According to some embodiments, the interpolation parameter can indicate the number of the omitted or skipped frames between two consecutive key frames. According to some embodiments, the interpolation parameter can indicate the variable frame rate of key frames 430. According to some embodiments, the interpolation parameter can indicate a length of time between any two consecutive key frames.

Furthermore, according to some embodiments, the interpolation parameter can indicate a preferred interpolation mode or method. Examples of the interpolation mode can be linear interpolation, parabolic interpolation, nearest neighbor method, code book, etc.

Next, key frames 430 can be input to vocoder model 453 for interpolation and waveform generation. As shown in this Figure, interpolation model 433 associated with vocoder model 453 can interpolate the omitted frames via one or more interpolation mode. As a result, interpolation model 433 can reconstruct a number of interpolated frames that are approximately similar to the omitted frames. According to some embodiments, the interpolated frames can be stitched together with key frames 430 to form de-compressed frames 435.

According to some embodiments, de-compressed frames 435 can be input to frame-rate network 455 and sample-rate network 457 for generating speech waveforms 461. Based on the reconstruction of the skipped frames, speech waveforms 461 can have comparable or the same sound quality as the original un-skipped speech waveforms.

Figure 5:
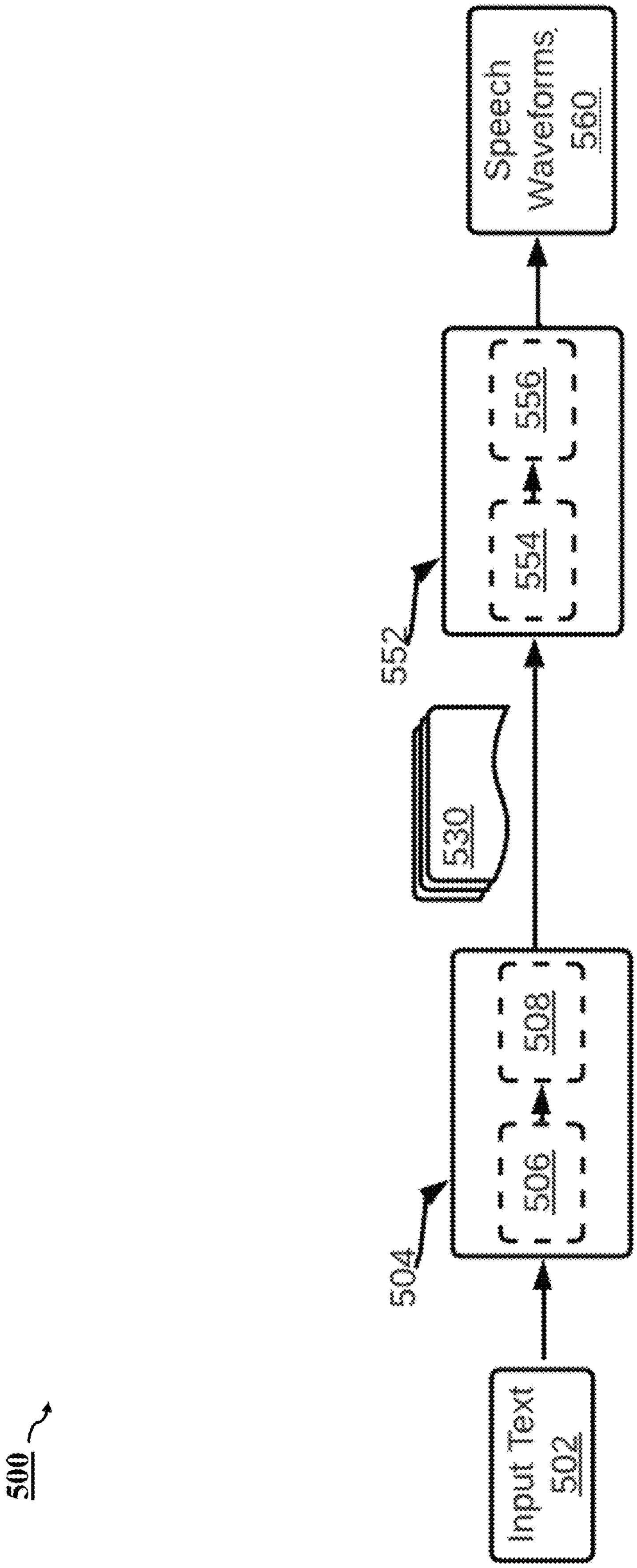
FIG. 5 shows yet another exemplary diagram of a TTS system for speech synthesis, according to one or more embodiments of the present subject matter.

FIG. 5 shows another exemplary diagram of a TTS system 500 for speech synthesis. TTS system 500 can process key frames 530 and generate speech waveforms 560 without the interpolation process. As shown in this figure, speech synthesis model 504 can pre-process input text 502 and generate a phoneme sequence. The phoneme sequence can be provided to symbol-rate network 506 and frame-rate network 508 for spectrogram frame prediction. According to some embodiments, speech synthesis model 504 can predict a number of key frames 530 with variable frame rates, while omitting other acoustic frames. According to some embodiments, the estimated amount of information remains substantially the same or similar in the key frames 530. According to some embodiments, the skipped frames can be related to a stable region of a phoneme, for example, the lasting "oo" region in "boot." Furthermore, the estimated number of the key frames can be half of the rate at which frames might be interpolated.

According to some embodiments, speech synthesis model 504 can generate the key frames based on an average key frame rate input, and the ratio of the number of key frames and the interpolated frames is associated with the average key frame rate input. For example, the average key frame rate can indicate the ratio of the key frames and the interpolated frames.

According to some embodiments, upon receiving key frames 530 with the respective interpolation parameters, vocoder model 552 can directly recognize and generate speech waveforms 560. According to some embodiments, vocoder model 552 can comprise frame-rate network 554 and sample-rate network 556, both of which can be autoregressive RNN models. As vocoder model 552 can have been trained with datasets that enable it to correlate key frames 530 with speech waveforms 560, it can generate speech waveforms 560 that share a comparable or equal sound quality with the original un-skipped speech waveforms. According to some embodiments, vocoder model 552 can be trained together with speech synthesis model 504 with the same training datasets and configuration.

Figure 6:
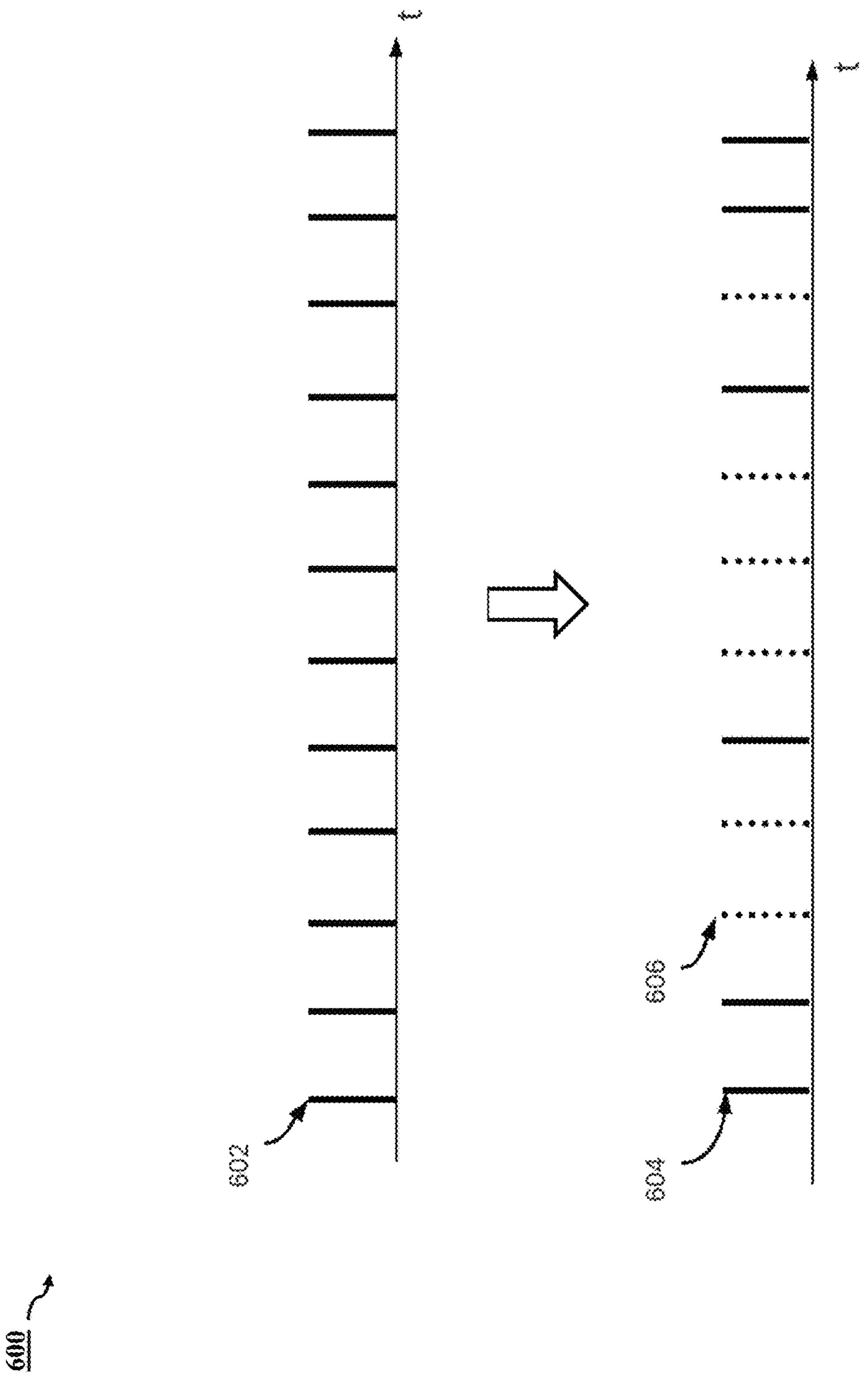
FIG. 6 shows exemplary frames generated by a TTS system, according to one or more embodiments of the present subject matter.

FIG. 6 shows exemplary frames generated by a TTS system 600 with simple frame skipping. FIG. 6 can represent Bark spectrogram frames of a phoneme sequence in the time domain, which can be generated by Bark filter banks. The original frames 602 can be fixed-frames at a fixed rate, e.g., 10 ms per frame (100 frames per second). A trained speech synthesis model can generate key frames 604 and not generate frames 606 corresponding to a constant frame rate. Key frames 604 can be chosen to optimize the piecewise linear approximation of an interpolation model. According to some embodiments, the speech synthesis model can select the key frames 604 via choosing compressed datasets with the minimized sum of square errors of approximation. With fewer frames to generate per utterance, the system can reduce the execution time and speed up speech synthesis or apply a larger model with more better sounding voice characteristics or both.

Furthermore, FIG. 6 can also represent the process to generate training datasets for the neural speech synthesis model. The original frames 602 of the training datasets are compressed so that the non-essential frames, e.g., the skipped frames 606, are omitted. The original datasets can comprise a number of audio clips of one or more speakers. For example, the LJ Speech dataset comprises short audio clips of a single speaker along with the transcriptions, whereas the LibriTTS dataset comprises multi-speaker English audio clips for many hours. In addition to English datasets, other international languages, such as French, Italian, and Japanese, can also be utilized for training a TTS for a specific market or application. According to some embodiments, either the raw waveform or pre-processed waveforms, e.g., after compression, can be used as input for the training process.

Different approaches or methods can be utilized to generate compressed datasets with high definition while significantly reducing the frame numbers. e.g., 50% or fewer frames. According to some embodiments, the original datasets, e.g., input text and its corresponding compressed waveforms or audio recordings, can be time-warped at a predetermined omission/compression ratio. For example, the omitted frames can be every other frame, or two of every five frames. According to some embodiments, the omitted frames can be redundant frames that contain substantially similar data values to the "neighboring" frames that are kept in the compressed datasets.

Furthermore, various cost/loss functions can be implemented to select a compression approach with least data loss between the original datasets and the compressed datasets. Examples of such cost functions can comprise Mixture of Logistics, or a normal-loss. The system can implement different versions or scenarios of the compressed datasets using each of the possible configures and select the one with the best performance, or least loss. For example, a number of potential cost functions can be implemented respectively for all the possible sets of frames to omit or the key frames to keep. As a result, a specific set of key frames that renders the least loss can be selected as the compressed training datasets.

For example, an exemplary cost function can be based on the sum of square errors from all the Bark parameters linearly interpolated between key frames and relative the omitted original frame that these parameters replaced, as shown below:

$$\text{Cost}=\text{SUM}[\text{over omitted frames } i](\text{SUM}[\text{over bark bin } k](((\text{interp}-\text{value})[i,k]-(\text{orig}-\text{value})[i,k])\hat{}2)$$

According to some embodiments, in addition to the linear interpolation method, other interpolation methods, such as parabolic interpolation, nearest neighbor method, code book, can also be adopted.

Figure 7:
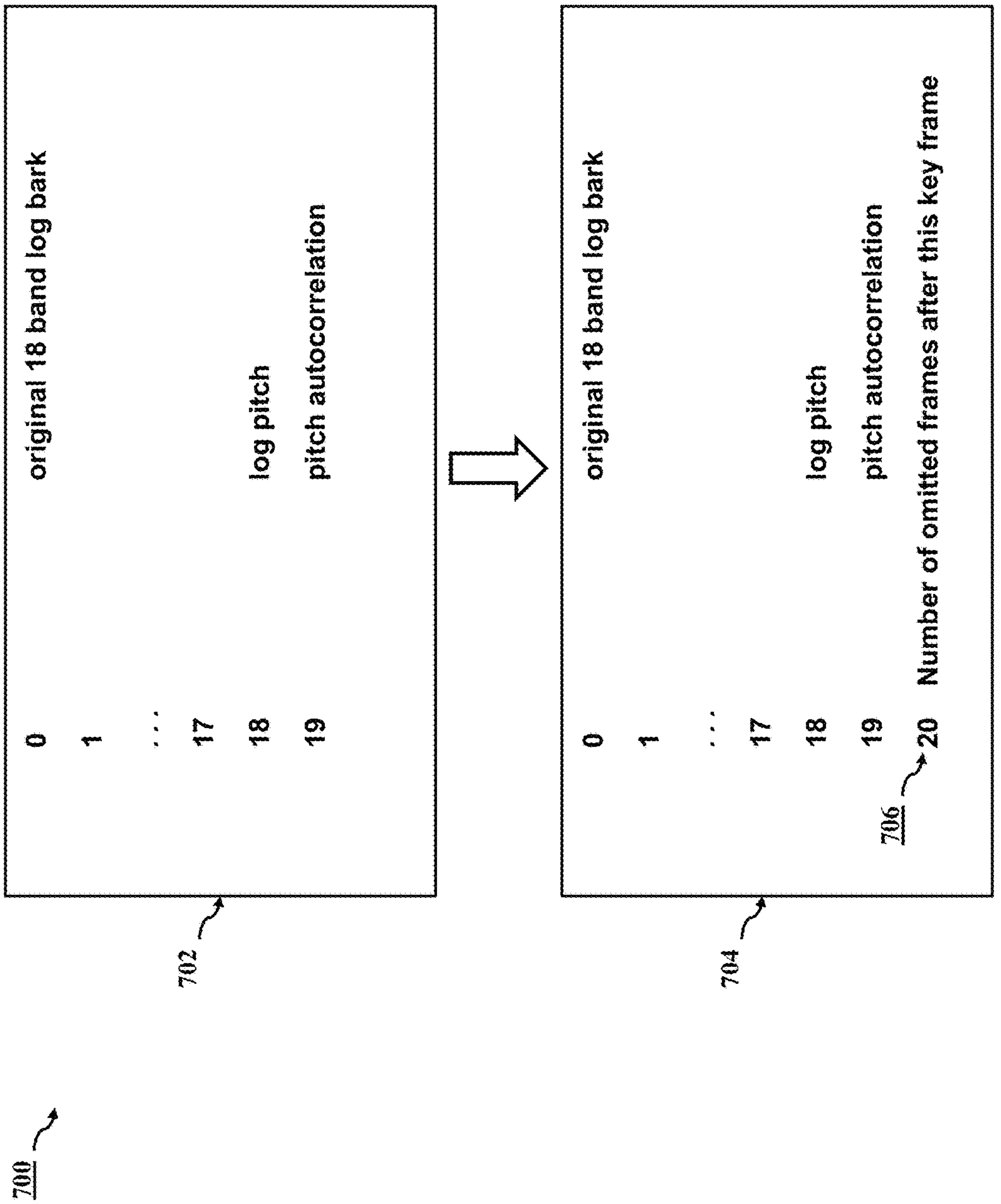
FIG. 7 shows exemplary parameters of a frame, according to one or more embodiments of the present subject matter.

FIG. 7 shows exemplary Bark parameters 700 of a frame. An original frame 702 can comprise the 18-band Bark-scale and 2 pitch parameters. As shown here, parameters 0-17 can represent the original 18 band log bark, whereas parameter 18 can correspond to the log pitch and parameter 19 can represent the pitch autocorrection data.

According to some embodiments, a key frame generated by the system can further comprise an additional interpolation parameter to facilitate the later interpolation/de-compression process. As shown in FIG. 7, a key frame 704 can comprise the original 18-dimensional Bark-Frequency Cepstrum Coefficients (BFCCs), i.e., parameters 0-17, the two pitch parameters, i.e., parameter 18 for log pitch and parameter 19 for pitch autocorrelation. In addition, it can comprise an interpolation parameter 706 (parameter 20). In this example, interpolation parameter 706 can indicate the number of omitted/skipped frames following this present key frame. For example, interpolation parameter 706 is 2 (parameter 20), which indicates that there are 2 skipped frames following the key frame 704. This interpolation parameter can be used to reconstruct the interpolated frames, i.e., 2, with approximate values between the aforementioned key frames.

According to some embodiments, interpolation parameter 706 can indicate a length of time between the key frames in contrast to simply indicating a number of frames to interpolate at a constant frame rate. In addition, interpolation parameter 706 can comprise an indicated interpolation mode for the later interpolation/de-compression process. Examples of the interpolation mode can be linear interpolation, parabolic interpolation, nearest neighbor method, code book, etc. For example, linear interpolation can apply a distinct linear polynomial between each pair of data points for curves.

A mode-based encoding, not shown in a drawing, is one that has a frame parameter 21 that indicates an interpolation mode. A vocoder or interpolation model capable of decoding such frames can use both the number of omitted frames and the encoded interpolation mode to interpolate frames. This can provide even better sounding interpolation than a single interpolation method built into the vocoder or interpolation model that is solely based on the number of frames skipped and spectrogram information.

It is also possible to use an encoding in which a frame skipping parameter indicates the number of frames to skip after the prior key frame rather. That is in contrast to an encoding in which the number of frames to skip is the number until the next key frame. In the former approach, interpolation can begin at the vocoder or interpolation model as soon as it receives an encoded keyframe without waiting for the next frame of data.

Figure 8:
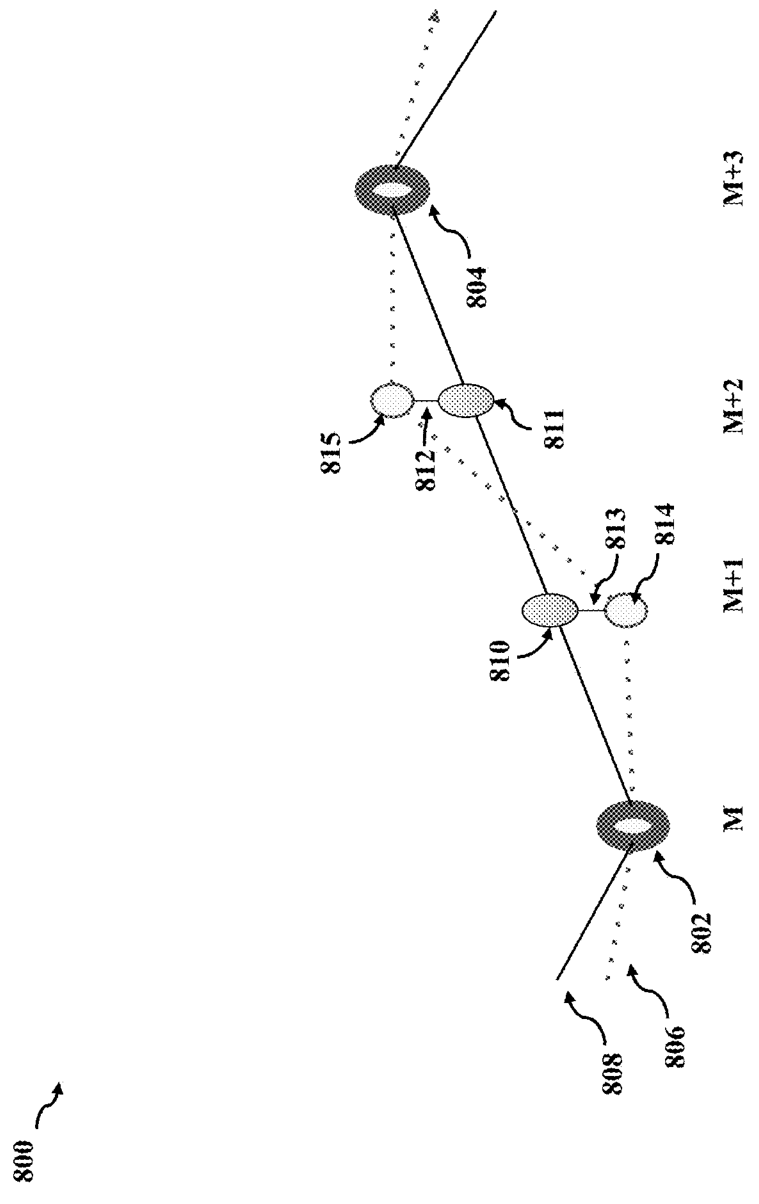
FIG. 8 shows an exemplary process of generating interpolated frames, according to one or more embodiments of the present subject matter.

FIG. 8 shows an exemplary process of an interpolation process 800 for one audio feature. As explained earlier, a speech synthesis model can generate a Nth key frame 802 and a consecutive (N+1)th key frame 804. According to some embodiments, the Nth key frame 802 can comprise an interpolation parameter. For example, it can comprise a parameter 20 with a value of 2, which indicates that the interpolation model should generate 2 frames before the (N+1)th key frame 804.

According to some embodiments, during an interpolation process, an interpolation model can reconstruct the omitted frames via various interpolation approaches. For example, linear interpolation can reconstruct the first interpolated frame 810 and the second interpolated frame 811 to produce the reconstructed data curve 808. The respective length of the first and second interpolated frames can be a constant inter-frame period. The respective value of the first interpolated frame and second frame can determine the reconstructed data curve 808. According to some embodiments, Nth key frame 802, first interpolated frame 810, second interpolated frame 811, and (N+1)th key frame 804, can be input for a vocoder model for generating sample waveforms of the input text.

According to some embodiments, a vocoder model can handle the interpolation process by reconstructing the omitted frames via various interpolation approaches. For example, linear interpolation can reconstruct the first interpolated frame 810 and the second interpolated frame 811 to create the reconstructed data curve 808. According to some embodiments, the vocoder model can generate sample waveforms based on Nth key frame 802, first interpolated frame 810, second interpolated frame 811, and (N+1)th key frame 804.

As shown in FIG. 8, the dotted line can represent the ground truth data curve 806. According to some embodiments, during a training route, the system can calculate the first data loss 813 between the first original frame 814 and the first interpolated frame 810, and the second data loss 812 between the second original frame 815 and the second interpolated frame 811. According to some embodiments, the cost function calculation and comparison can be used to train for the least statistical data loss between the training data frames and the interpolated frames.

Figure 9:
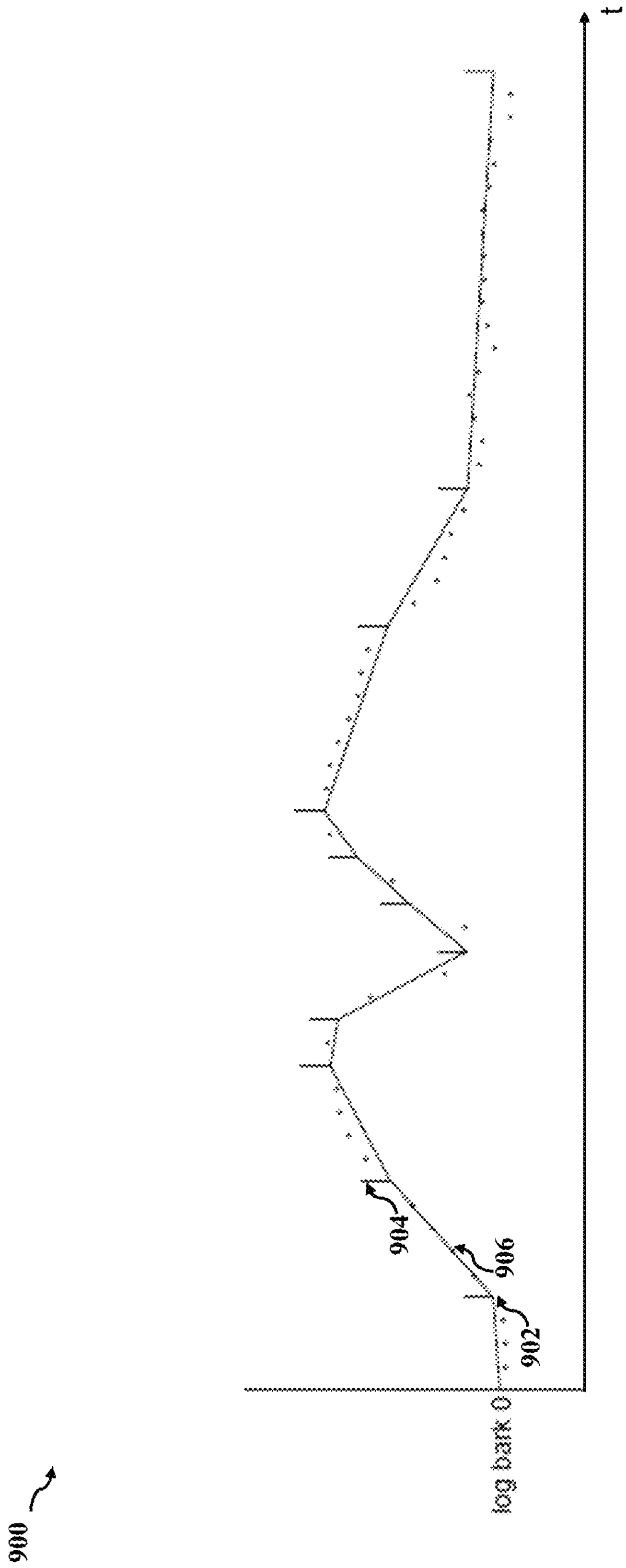
FIG. 9 shows exemplary key frames chart generated by a TTS system, according to one or more embodiments of the present subject matter.

FIG. 9 shows an exemplary key frames chart 900 generated by a TTS system. The curve line can represent the log bark 0 feature of an utterance/input text in time domain. As shown in this figure, first key frame 902 and second key frame 904 are two consecutive key frames generated by the trained speech synthesis model. There are a number of frames skipped between the two generated key frames. As aforementioned, the interpolation model can periodically reconstruct the skipped frames, e.g., 906 and other frames at a fixed interval, between the key frames. The combined frames can be input to the vocoder model for speech synthesis.

Figure 10:
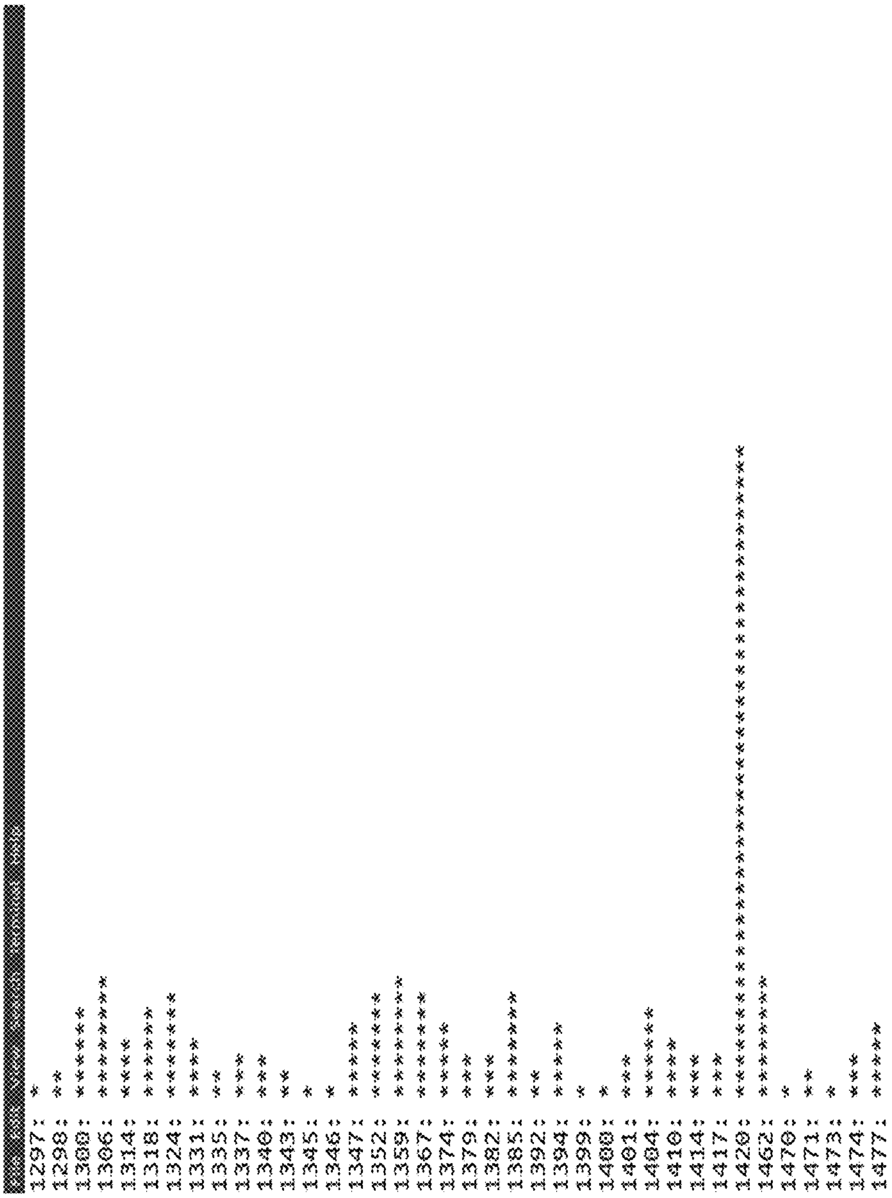
FIG. 10 shows an exemplary frame data listing, according to one or more embodiments of the present subject matter.

FIG. 10 shows an exemplary frame data listing 1000. As shown in this figure, the first column can list the frame ID or frame number for the generated key frames. The second column indicates the number of frames skipped for each of the generated key frames. For example, the key frame with frame number 1297 has 1 star, which indicates there are no skipped frame between this present key frame (frame number 1297) and the next key frame (frame number 1298). For example, the key frame with frame number 1298 has the interpolation parameter of 2 (parameter 20), which indicates that there is one skipped frame between the present key frame (frame number 1298) and the next key frame (frame number 1300). The exemplary frame data listing 1000 can be utilized to indicate the number of frames to be interpolated between key frames, either by an interpolation model between a speech synthesis model and a vocoder, or by an appropriately designed vocoder in an interpolation process.

Figure 11:
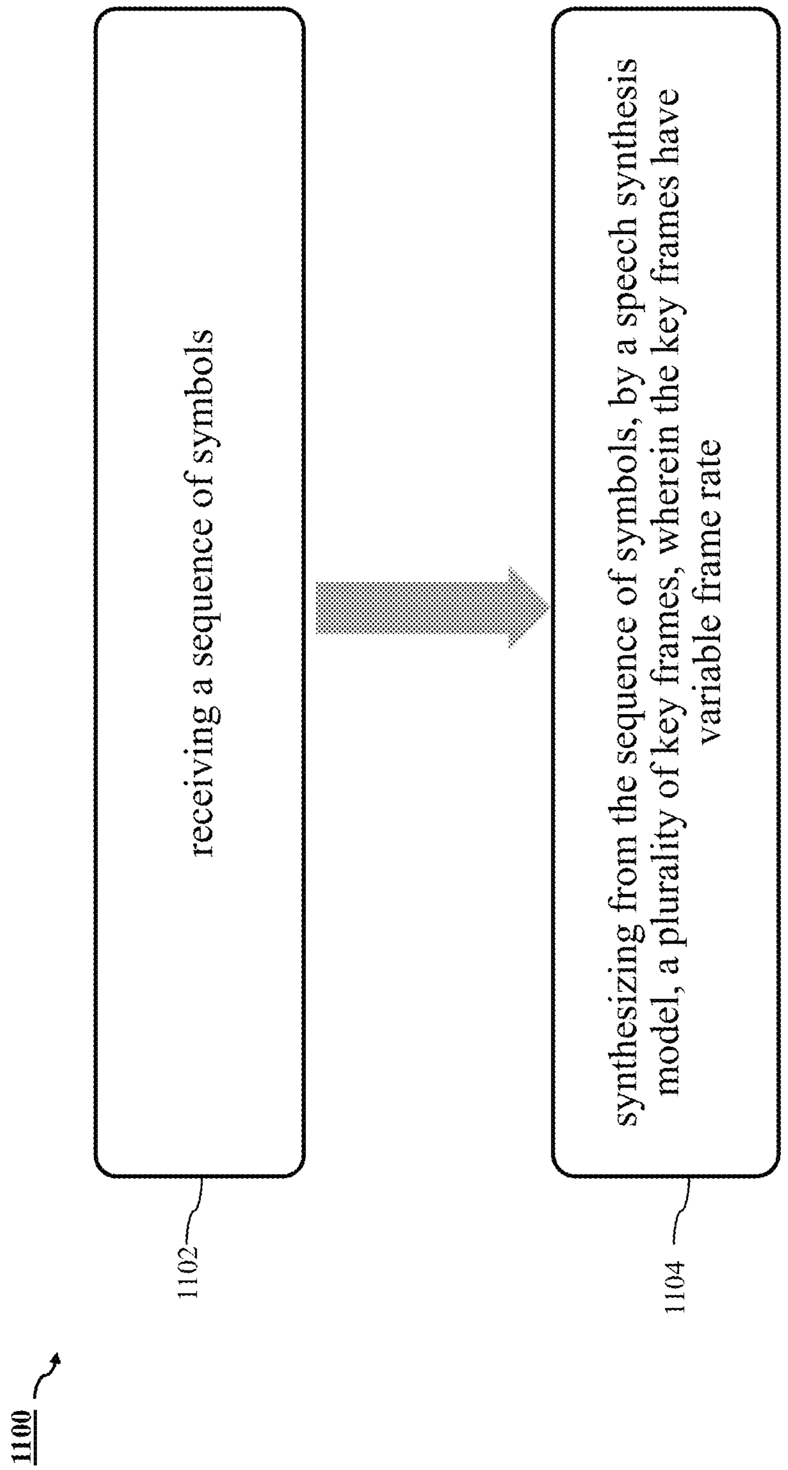
FIG. 11 shows an exemplary process of speech synthesis, according to one or more embodiments of the present subject matter.

FIG. 11 shows an exemplary process of speech synthesis 1100. At step 1102, the TTS system can receive a sequence of symbols for speech synthesis. The sequence of symbols can be, for example, a phoneme sequence converted from input texts. At step 1104, the TTs system can synthesize from the sequence of symbols, by a speech synthesis model, a number of key frames. According to some embodiments, the key frames can have variable frame rate, and a key frame comprises at least one interpolation parameter that indicates the number of skipped frames to be interpolated.

According to some embodiments, the interpolation parameter can indicate the number of the skipped frames between two consecutive key frames, e.g., the interpolation parameter is 2, indicating there are two skipped frames. According to some embodiments, the interpolation parameter can indicate a length of time between the key frames. According to some embodiments, the interpolation parameter can comprise an indicated interpolation mode, e.g., linear interpolation, parabolic interpolation, code book, etc.

According to some embodiments, the speech synthesis model can generate the plurality of key frames based on an average encoded key frame rate input, and the ratio of the number of the plurality of key frames and the one or more skipped frames is associated with the average key frame rate input. This is a form of dynamic rate control to enable an adjustable trade-off between reducing the processor performance and power cost of frame generation by having fewer key frames and more interpolation and voice quality by having more key frames and less interpolation.

According to some embodiments, after generating the key frames, an interpolation model can interpolate one or more interpolated frames based on the interpolation parameter. Accordingly, a vocoder model can generate speech waveforms corresponding to the sequence of symbols based on the key frames and the interpolated frames.

According to some embodiments, after generating the key frames, a vocoder model can interpolate one or more interpolated frames based on the interpolation parameter. Next, the vocoder model can generate speech waveforms corresponding to the sequence of symbols based on the key frames and the interpolated frames.

Figure 12:
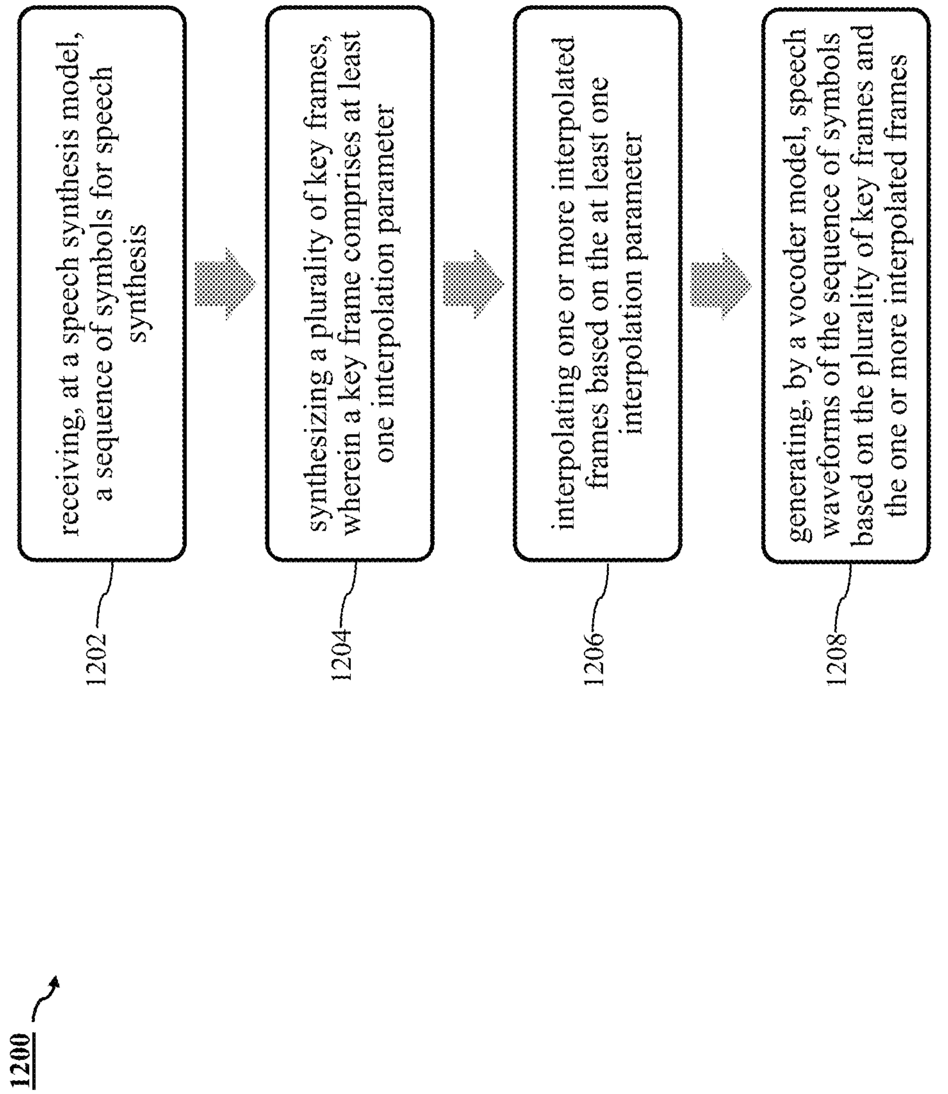
FIG. 12 shows another exemplary process of speech synthesis, according to one or more embodiments of the present subject matter.

FIG. 12 shows another exemplary process of speech synthesis 1200. At step 1202, the TTS system can receive a sequence of symbols for speech synthesis at a speech synthesis model. The sequence of symbols can be a phoneme sequence converted from input texts. At step 1204, the TT S system can synthesize from the sequence of symbols, by a speech synthesis model, a number of key frames. According to some embodiments, the key frames can have variable frame rates, and a key frame comprises at least one interpolation parameter that indicates the variable frame rate.

According to some embodiments, the interpolation parameter can indicate the number of the skipped frames between two consecutive key frames, e.g., the interpolation parameter is 2, indicating there are two skipped frames. According to some embodiments, the interpolation parameter can indicate a length of time between the key frames. According to some embodiments, the interpolation parameter can comprise an indicated interpolation mode, e.g., linear interpolation, parabolic interpolation, code book, etc.

According to some embodiments, the speech synthesis model can generate the plurality of key frames based on an average key frame rate input, and the ratio of the number of the plurality of key frames and the one or more skipped frames is associated with the average key frame rate input.

At step 1206, after generating the key frames, an interpolation model can interpolate one or more interpolated frames based on the interpolation parameter. At step 1208, a vocoder model can generate speech waveforms corresponding to the sequence of symbols based on the key frames and the interpolated frames.

According to some embodiments, after generating the key frames, a vocoder model can interpolate one or more interpolated frames based on the interpolation parameter. Next, the vocoder model can generate speech waveforms corresponding to the sequence of symbols based on the key frames and the interpolated frames.

Figure 13A:
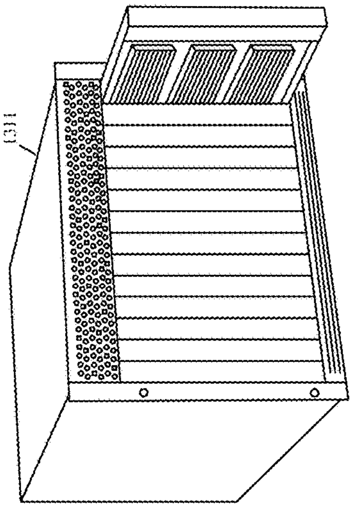
FIG. 13A shows a server system of rack-mounted blades, according to one or more embodiments of the present subject matter.

FIG. 13A shows a server system of rack-mounted blades. Various examples are implemented with cloud servers, such as ones implemented by data centers with rack-mounted server blades. FIG. 13A shows a rack-mounted server blade multi-processor server system 911. Server system 911 comprises a multiplicity of network-connected computer processors that run software in parallel.

Figure 13B:
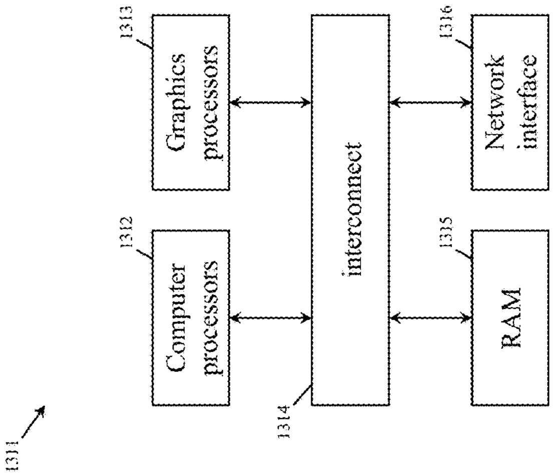
FIG. 13B shows a diagram of a networked data center server, according to one or more embodiments of the present subject matter.

FIG. 13B shows a diagram of a server system 1311. It comprises a multicore cluster of computer processors (CPU) 1312 and a multicore cluster of the graphics processors (GPU) 1313. The processors connect through a board-level interconnect 1314 to random-access memory (RAM) devices 1315 for program code and data storage. Server system 1311 also comprises a network interface 1316 to allow the processors to access the Internet, non-volatile storage, and input/output interfaces. By executing instructions stored in RAM devices 1315, the CPUs 1312 and GPUs 1333 perform steps of methods described herein.

Figure 14A:
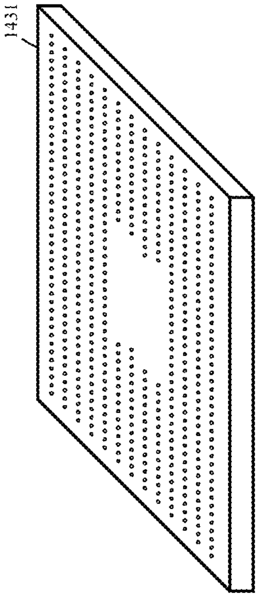
FIG. 14A shows a packaged system-on-chip device, according to one or more embodiments of the present subject matter.

FIG. 14A shows the bottom side of a packaged system-on-chip device 1431 with a ball grid array for surface-mount soldering to a printed circuit board. Various package shapes and sizes are possible for various chip implementations. System-on-chip (SoC) devices control many embedded systems, IoT device, mobile, portable, and wireless implementations.

Figure 14B:
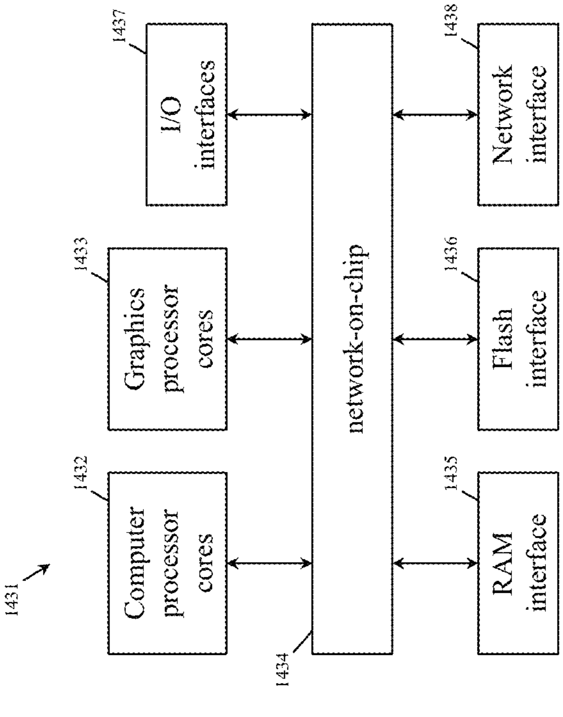
FIG. 14B shows a block diagram of a system-on-chip, according to one or more embodiments of the present subject matter.

FIG. 14B shows a block diagram of the system-on-chip 1431. It comprises a multicore cluster of computer processor (CPU) cores 1432 and a multicore cluster of graphics processor (GPU) cores 1433. The processors connect through a network-on-chip 1434 to an off-chip dynamic random access memory (DRAM) interface 1435 for volatile program and data storage and a Flash interface 1436 for non-volatile storage of computer program code in a Flash RAM non-transitory computer readable medium. SoC 1431 also has a display interface for displaying a graphical user interface (GUI) and an I/O interface module 1437 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 1431 also comprises a network interface 1438 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 1435 or Flash devices through interface 1436, the CPU cores 1432 and GPU cores 1433 perform functionality as described herein.

Examples shown and described use certain spoken languages. Various embodiments work, similarly, for other languages or combinations of languages. Some systems are screenless, such as an earpiece, which has no display screen. Some systems are stationary, such as a vending machine. Some systems are mobile, such as an automobile. Some systems are portable, such as a mobile phone. Some systems are for implanting in a human body. Some systems comprise manual interfaces such as keyboards or touchscreens.

Some systems function by running software on general-purpose programmable processors (CPUs) such as ones with ARM or x86 architectures. Some power-sensitive systems and some systems that require especially high performance, such as ones for neural network algorithms, use hardware optimizations. Some systems use dedicated hardware blocks burned into field-programmable gate arrays (FPGAs). Some systems use arrays of graphics processing units (GPUs). Some systems use application-specific-integrated circuits (ASICs) with customized logic to give higher performance.

Some physical machines described and claimed herein are programmable in many variables, combinations of which provide essentially an infinite variety of operating behaviors. Some systems herein are configured by software tools that offer many parameters, combinations of which support essentially an infinite variety of machine embodiments.

Hardware blocks, custom processor instructions, co-processors, and hardware accelerators perform neural network processing or parts of neural network processing algorithms with especially high performance and power efficiency. This enables extended battery life for battery-powered devices and reduces heat removal costs in data centers that serve many client devices simultaneously.

In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A computer-implemented method of speech synthesis, the method comprising:

receiving a sequence of symbols; and synthesizing from the sequence of symbols, by a speech synthesis model, a plurality of key frames based on an average key frame rate input, wherein a key frame comprises at least one interpolation parameter indicating the ratio of the number of the plurality of key frames and one or more skipped frames is associated with the average key frame rate input.

2. The computer-implemented method of claim 1, wherein the at least one interpolation parameter indicates one or more skipped frames between the plurality of key frames.

3. The computer-implemented method of claim 1, wherein a frame rate of the plurality of key frames is variable and the at least one interpolation parameter indicates a length of time between the key frames.

4. The computer-implemented method of claim 1, wherein the at least one interpolation parameter comprises an indicated interpolation mode.

5. The computer-implemented method of claim 1, further comprising:

interpolating, by an interpolation model, one or more interpolated frames based on the plurality of key frames and the at least one interpolation parameter; and generating, by a vocoder model, speech waveforms of the sequence of symbols based on the plurality of key frames and the one or more interpolated frames.

6. The computer-implemented method of claim 1, further comprising:

interpolating, by a vocoder model, one or more interpolated frames based on the plurality of key frames and the at least one interpolation parameter; and generating, by the vocoder model, speech waveforms of the sequence of symbols based on the plurality of key frames and the one or more interpolated frames.

7. A computer-implemented method of speech synthesis, the method comprising:

receiving, at a speech synthesis model, a sequence of symbols for speech synthesis;

synthesizing a plurality of key frames based on an average key frame rate input, wherein a key frame comprises at least one interpolation parameter indicating the ratio of the number of the plurality of key frames and the one or more skipped frames is associated with the average key frame rate input;

interpolating, by an interpolation model, one or more interpolated frames based on the plurality of key frames and the at least one interpolation parameter; and generating, by a vocoder model, speech waveforms of the sequence of symbols based on the plurality of key frames and the one or more interpolated frames.

8. The computer-implemented method of claim 7, wherein the plurality of key frames have a variable frame rate.

9. The computer-implemented method of claim 7, wherein the at least one interpolation parameter indicates one or more skipped frames between the plurality of key frames.

10. The computer-implemented method of claim 7, wherein the at least one interpolation parameter indicates a length of time between the plurality of key frames.

11. The computer-implemented method of claim 7, wherein the at least one interpolation parameter comprises an indicated interpolation mode.

12. A computer-implemented method of speech synthesis, the method comprising:

receiving, at a speech synthesis model, a sequence of symbols for speech synthesis;

synthesizing a plurality of key frames based on an average key frame rate input, wherein a key frame comprises at least one interpolation parameter indicating the ratio of the number of the plurality of key frames and the one or more skipped frames is associated with the average key frame rate input;

interpolating, by a vocoder model, one or more interpolated frames based on the plurality of key frames and the at least one interpolation parameter; and generating, by the vocoder model, speech waveforms of the sequence of symbols based on the plurality of key frames and the one or more interpolated frames.

13. The computer-implemented method of claim 12, wherein the plurality of key frames have a variable frame rate.

14. The computer-implemented method of claim 12, wherein the at least one interpolation parameter indicates one or more skipped frames between the plurality of key frames.

15. The computer-implemented method of claim 12, wherein the at least one interpolation parameter indicates a length of time between the plurality of key frames.

16. The computer-implemented method of claim 12, wherein the at least one interpolation parameter comprises an indicated interpolation mode.

* * * * *